US009276935B2

(12) United States Patent
Dubhashi et al.

(10) Patent No.: US 9,276,935 B2
(45) Date of Patent: Mar. 1, 2016

(54) DOMAIN MANAGER FOR EXTENDING DIGITAL-MEDIA LONGEVITY

(75) Inventors: Kedarnath A. Dubhashi, Redmond, WA (US); Reid Joseph Kuhn, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1437 days.

(21) Appl. No.: 12/473,102

(22) Filed: May 27, 2009

(65) Prior Publication Data

US 2010/0306485 A1 Dec. 2, 2010

(51) Int. Cl.
| | |
|---|---|
| G06F 21/00 | (2013.01) |
| H04L 29/06 | (2006.01) |
| G06F 21/10 | (2013.01) |
| H04L 29/12 | (2006.01) |

(52) U.S. Cl.
CPC ............. H04L 63/10 (2013.01); G06F 21/10 (2013.01); G06F 21/105 (2013.01); H04L 29/12047 (2013.01); H04L 61/15 (2013.01); H04L 63/062 (2013.01); *G06F 2221/2107* (2013.01); *G06F 2221/2115* (2013.01); *H04L 2463/101* (2013.01)

(58) Field of Classification Search
USPC .............. 705/56, 16, 21, 59, 71; 380/44, 262, 380/278, 279
See application file for complete search history.

(56) References Cited

U.S. PATENT DOCUMENTS

| | | | |
|---|---|---|---|
| 7,200,575 B2 | 4/2007 | Hans et al. | |
| 7,389,273 B2 | 6/2008 | Irwin et al. | |
| 7,506,367 B1* | 3/2009 | Ishibashi ................. | G06F 21/10 380/203 |
| 8,130,965 B2* | 3/2012 | Wasilewski ............ | H04N 5/913 380/239 |
| 2002/0157002 A1* | 10/2002 | Messerges et al. ........... | 713/155 |
| 2006/0107046 A1* | 5/2006 | Raley ...................... | G06F 21/10 713/168 |
| 2006/0177066 A1* | 8/2006 | Han ....................... | H04L 63/061 380/277 |
| 2007/0180084 A1* | 8/2007 | Mohanty ....................... | 709/223 |
| 2007/0250617 A1* | 10/2007 | Kim ....................... | G06F 21/105 709/223 |
| 2007/0271258 A1 | 11/2007 | Martin et al. | |

(Continued)

FOREIGN PATENT DOCUMENTS

| | | |
|---|---|---|
| EP | 1830512 A1 | 9/2007 |
| WO | 2008058123 A2 | 5/2008 |

OTHER PUBLICATIONS

"Backup Media", Retrieved at<<http://www.computerbackupdata.com/backup-media/>>, pp. 3.

(Continued)

*Primary Examiner* — Dante Ravetti
(74) *Attorney, Agent, or Firm* — Sunah Lee; Judy Yee; Micky Minhas

(57) ABSTRACT

A system is disclosed for providing trusted third-party management of user device domains in a digital rights management environment. The system includes a plurality of content providers that distribute digital content items via user accounts having associated user device domains. The user device domains are managed by an independent domain manager. The domain manager includes a device registrar which is operative, for a given user device domain, to receive a request to add a device to the user device domain. If the request is grantable, a domain controller of the domain manager is operative to cause a domain private key to be transmitted to the device being added to the user device domain. The domain private key is usable at the device to decrypt a content key which was previously released to the user device domain for decrypting protected digital content.

5 Claims, 5 Drawing Sheets

(56) References Cited

U.S. PATENT DOCUMENTS

| | | |
|---|---|---|
| 2008/0016307 A1* | 1/2008 | Takano et al. .............. 711/164 |
| 2008/0235511 A1 | 9/2008 | O'Brien et al. |
| 2008/0244204 A1* | 10/2008 | Cremelie et al. ............ 711/162 |
| 2008/0289044 A1 | 11/2008 | Choi |
| 2008/0313264 A1* | 12/2008 | Pestoni .................. G06F 21/10 709/202 |
| 2009/0002333 A1 | 1/2009 | Maxwell et al. |
| 2009/0064341 A1 | 3/2009 | Hartung et al. |
| 2009/0100529 A1* | 4/2009 | Livnat ................... G06F 21/10 726/28 |
| 2009/0210724 A1* | 8/2009 | Hori ........................ 713/193 |

OTHER PUBLICATIONS

Rothenberg Jeff, "Ensuring the Longevity of Digital Information", Retrieved at<<http://www.clir.org/pubs/archives/ensuring.pdf>>, this paper is an expanded version of the article "Ensuring the Longevity of Digital Documents" that appeared in the Jan. 1995 edition of Scientific American, Feb. 22, 1999, pp. 19.

* cited by examiner

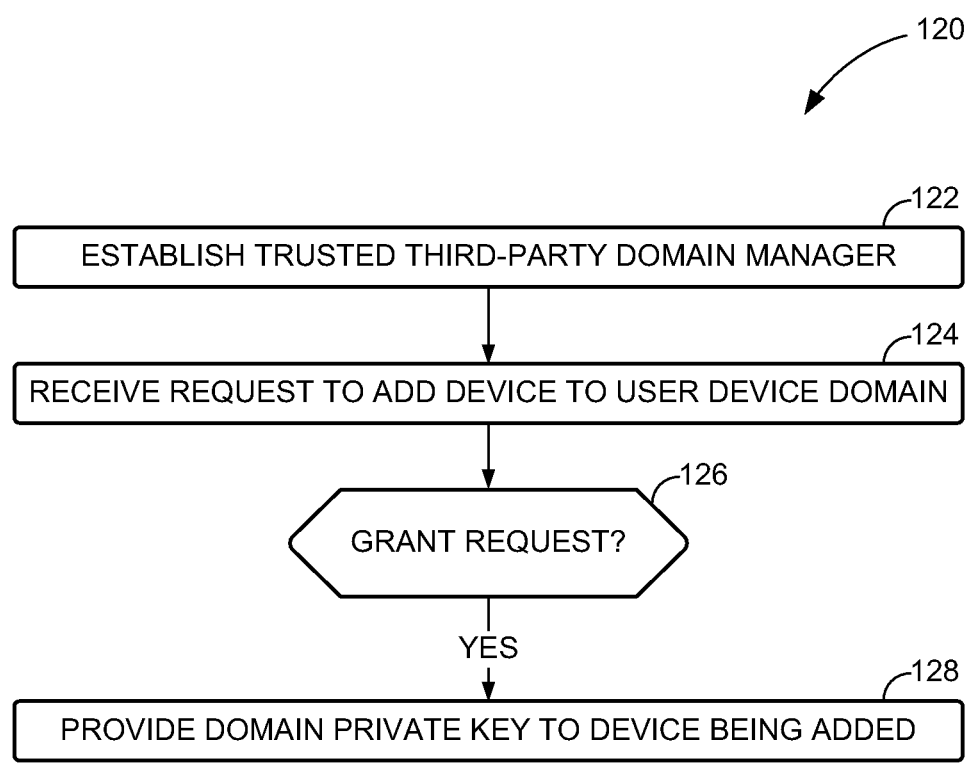

DOMAIN MANAGER FOR EXTENDING DIGITAL-MEDIA LONGEVITY

BACKGROUND

Digital content has become ubiquitous. Music, video, textual works, graphical works, games, and countless other types of content are saved in various digital formats. While digital formats offer many benefits, the ease with which exact duplicates can be made poses some challenges. In particular, because digital duplicates can be made without losing any quality and/or fidelity, it can be difficult to prevent the unauthorized copying and distribution of digital content. Digital rights management and other methods may be employed to control content, but in some cases this may lead to a frustrating user experience and/or prevent legitimate access to content for which the user has properly obtained rights.

SUMMARY

The present description provides a system for centrally managing user device domains in a digital rights management environment. The system includes a plurality of content providers that distribute digital content items and that are independent of one another. The plurality of content providers issue domain-bound licenses to user device domains that are associated with user accounts of the content providers. The user device domains are managed by an independent domain manager. The domain manager is operative to manage a user device domain for each of the user accounts of the content providers. The domain manager includes a device registrar. For a given one of the user device domains, the device registrar is operative to receive a request to add and/or remove a device to the user device domain. If an add request is grantable, a domain controller of the domain manager is operative to cause a domain private key to be transmitted to the device being added to the user device domain. The domain private key is usable at the newly-added device to decrypt a content key which was previously released to the user device domain for decrypting protected digital content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 depicts an exemplary method for managing DRM user device domains.

DETAILED DESCRIPTION

A digital rights management (DRM) system is disclosed in which a trusted third party provides management functionality for DRM domains. The management functionality may include permitting registration of additional devices into user device domains, removal of devices from user device domains, viewing currently registered devices in user domains, providing backups of digital content and/or associated licenses, distributing decryption keys under appropriate circumstances, and other functionality. As described below, the management functionality may be provided by a central entity on behalf of multiple independent content providers. In certain example settings, the trust relationship established with the central entity allows subsequent changes to a user device domain, such as device removal and/or addition and use of new devices, without any further interaction between the initial content provider and the user device domain.

Turning now to the figures, various example embodiments and method implementations will be described. Components and/or steps that are designated with like reference numbers should be considered to be of similar construction and function, unless specifically stated otherwise. Where a reference number from a previous figure appears in a subsequent figure, the corresponding element may not be re-described in detail with respect to the subsequent figure, unless additional information or clarification is helpful.

Figure 1:
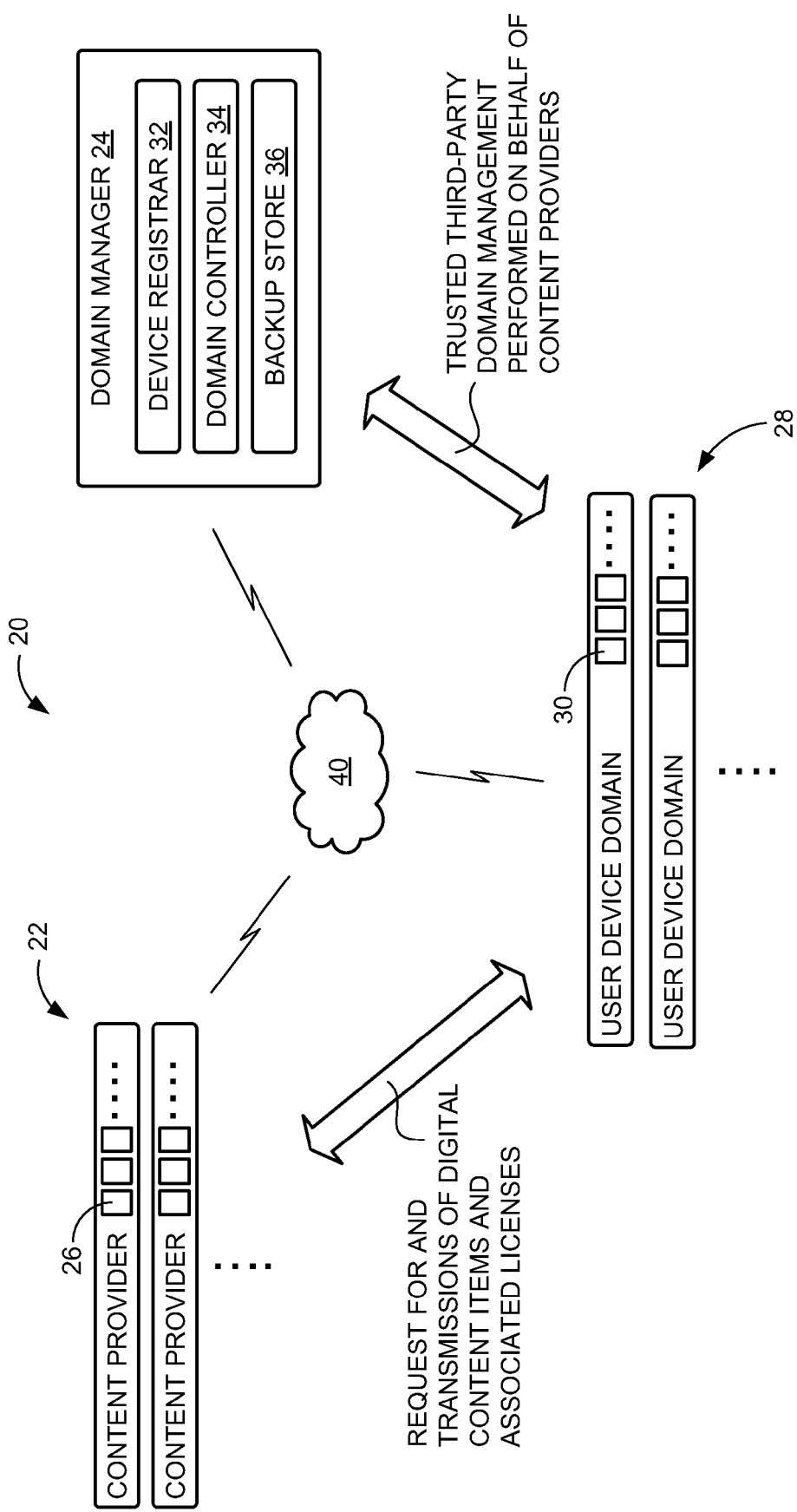
FIG. 1 schematically depicts a system according to the present description for centrally managing user device domains in a digital rights management (DRM) environment.

FIG. 1 schematically depicts a system 20 for implementing a DRM system and for providing central management of user device domains by a trusted third party. System 20 includes a plurality of content providers 22 that offer digital content items. The digital content items may include virtually any type of digital content, including digital music, video, textual works, graphical works, games, etc. As indicated in the figure, the system may include any number of content providers 22. Typically, the system includes multiple content providers 22 that are independent of one another, but that all make use of a trusted third party, such as domain manager 24, in order to manage user device domains that receive DRM-protected content from the content providers 22.

Each content provider 22 includes one or more user accounts 26. A customer may, for example, set up a user account with a particular content provider in order to purchase or otherwise obtain digital music files. System 20 further includes a plurality of user device domains. Each user device domain 28 is associated with one or more of the user accounts 26, and includes one or more devices 30 that allow a user to access digital content items obtained via the user account from the respective content providers 22 for which that domain is associated with.

The mechanism of the user device domain allows a user to connect multiple devices to a user account. For example, the user may want to play a purchased movie on a desktop computer and on a portable video player device. Binding the content license for the video to the user's domain 28 will enable the user to play the content on each device 30 registered to their domain 28. The user's domain must be configured by a trusted entity, such as domain manager 24, in a way to maintain compliance with license terms governing the use of the content for content provider 22 (e.g., license terms dictated by a content provider 22).

Domain manager 24 is configured to perform various functions in connection with managing user device domains 28 on behalf of content providers 22. As indicated, domain manager 24 may include a device registrar 32, a domain controller 34 and a backup store 36. The particular operation of these components will be described in detail with respect to various examples. Connectivity between the depicted components of FIG. 1 may be provided by a network 40 or any other suitable link.

Still referring to FIG. 1, in general, devices within the user device domains interact with the content providers to obtain digital content items. These digital content items may be transmitted from the content providers to the requesting devices, along with licenses which include policies governing use of the digital content items. The licenses also include content keys which allow the receiving device to decrypt and therefore use the transmitted digital content items, provided the use is in compliance with the policies specified in the associated license. The licenses and content keys may be bound to the user device domain, rather than a particular device, as described in more detail herein.

Figure 2:
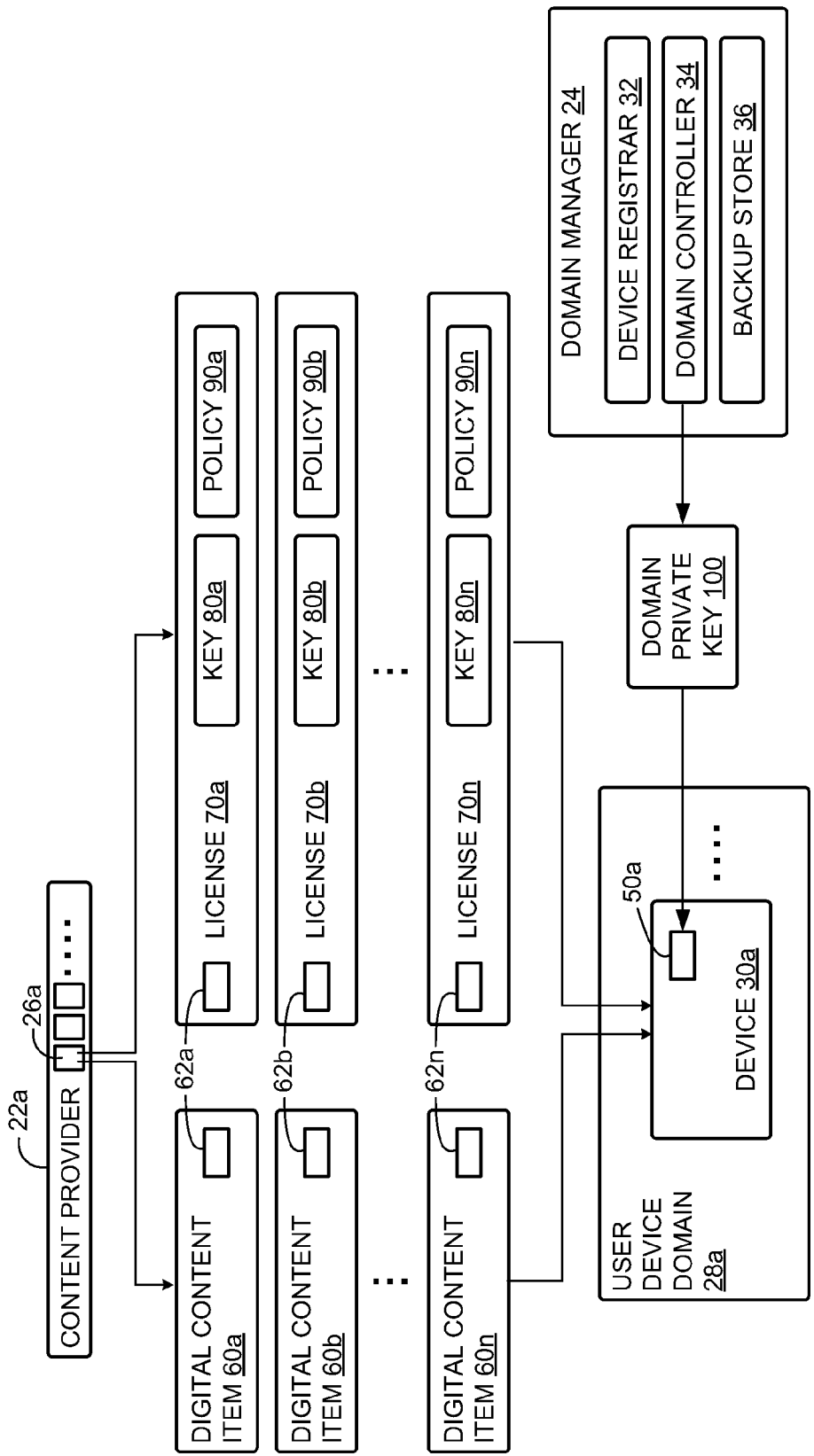
FIG. 2 schematically depicts interactions between an example content provider and a user device domain, and schematically depicts domain management performed by a trusted third-party domain manager.

FIG. 2 shows various example interactions that may occur with a particular content provider and user device domain. Specifically, the figure shows activity occurring with respect to user account 26a of content provider 22a. Associated with user account 26a is user device domain 28a, which is associated with a device 30a, which may include a local enforcement agent 50a for enforcing digital rights associated with digital content items received by the device. Device 30a is part of user device domain 28a, which may include devices in addition to device 30a.

The example user account transactions shown in the figure include providing various digital content items to device 30a, include digital content item 60a, digital content item 60b and digital content item 60n. Any practicable number and type of digital content items may be provided to the device. Each digital content item may include an identifier to allow matching of the digital content item to a license governing use of the item. For example, the depicted content items respectively include identifier 62a, identifier 62b and identifier 62n.

Associated with each digital content item is a license (e.g., license 70a, license 70b and license 70n), which may be provided separately or in connection with the original transmission of the content items to device 30a. The licenses may each include the identifiers (62a, 62b and 62n), allowing the license to be matched to the appropriate digital content item.

The digital content items typically are provided in an encrypted form. Accordingly, each license may include a domain-bound content key (content key 80a, content key 80b and content key 80n) that is usable at device 30a to decrypt the associated digital content item. The license further include a policy (e.g., policy 90a, policy 90b and policy 90n) that specifies relevant conditions and circumstances under which the respective digital content item can be used (viewed, played, executed, etc.) at device 30a. For example, content key 80a may be a cryptographic key that allows local enforcement agent 50a to decrypt digital content item 60a so that it can be viewed, listened to, etc. by a user of device 30a. The local enforcement agent may selectively permit or prohibit the access to the digital content item (e.g., by preventing use of the content key) if the conditions of policy 90a are not satisfied.

The licenses of FIG. 2 and the other examples herein provide a digital representation of the rights and restrictions a content consumer possesses with respect to the corresponding digital content item. The license may be held on a data-holding subsystem, such as a hard drive of a network accessible server and/or a local drive and/or memory of a user device, such as device 30a. The license typically is formatted so as to be read and/or interpreted by one or more different applications. In the example of FIG. 2, local enforcement agent 50a may be a standalone application associated with device 30a, or may be incorporated into a specific application running on the device, such as a media-playing application.

Regardless of the particular application that reads and/or interprets the license, the application and/or local enforcement agent may enforce the policies of the license, and use the content key of the license to decrypt the digital content item for one or more purposes. Furthermore, applications or local enforcement agents that are not compatible with the DRM systems described herein and/or are not trusted to enforce the policies of the license are not allowed to use the content key of the license to decrypt the digital content item.

The policy of the license may allow decryption for one or more different purposes and/or usages, such as decrypting for the purpose of playing the encrypted digital content, decrypting for the purpose of copying the encrypted digital content, decrypting for the purpose of executing the digital content, etc. Each purpose for which the digital content item may be decrypted corresponds to a right offered by the license. As such, the license is a digital representation of the rights associated with a particular digital content item for a particular device, domain, or other category of license recipient.

The policy of the license may also allow decryption when one or more conditions are satisfied. For example, a policy may allow decryption during a finite time duration (e.g., before an expiration date, and/or upon passing a predetermined date). As another example, a policy may allow only a finite number of decryptions (e.g., a digital content item may be limited to a set number of play counts). In other words, the rights offered by a license may have one or more parameters that further indicate the conditions under which decryption is allowed. The rights offered by a license may also have one or more restrictions that limit or govern decryption.

When a digital content item is protected under a digital rights management system in accordance with the present disclosure, a content consumer may utilize that digital content item after obtaining a license that includes a cryptographic decryption key for decrypting that digital content item. Once a license is acquired, it may be saved for convenient retrieval. As a non-limiting example, a license may be saved on the same device on which the digital content item is saved.

A digital content item may include a pointer that directs a content consumer to a location at which a corresponding license may be acquired. In this way, if a content consumer does not currently have a relevant license, the content consumer may acquire the relevant license and thus decrypt the digital content item. As a non-limiting example, a license acquisition server may be maintained for issuing licenses upon request. A license acquisition server can issue a license that includes an encrypted decryption key, so that only intended content consumers (e.g., device or domain) may use the license to decrypt the digital content item. A license acquisition server may be network accessible, such as via the Internet. In such cases, each digital content item may include a Uniform Resource Locator (URL) that points to the license acquisition server. As a further example and alternative, an application and/or local enforcement may be pre-configured to look in a particular designated location for obtaining licenses.

Referring still to FIG. 2, the user device domain provides a mechanism by which a license may be bound to a user device domain, rather than an individual device. In effect, the license is granted to the user device domain, provided the user device domain is established and maintained in accordance with parameters and restrictions that are acceptable to the content provider.

As previously discussed, domain manager 24 may function as a trusted third party to manage user device domains. In the present example, domain manager 24 may establish user device domain 28a on behalf of content provider 22a. The creation of the domain can occur, for example, in connection with initial setup of the user account. During this initial setup, the user can register one or more of their devices that they wish to use with the account, for example to download and obtain licensed access to digital content items. Furthermore, it should be appreciated that a given user domain may be connected to multiple content providers and/or user accounts. In such a case, the domain manager operates to manage the domain (register devices, add/remove devices, etc.) in accordance with all of the policies and restrictions associated with the multiple content providers and/or user accounts.

Typically, a key pair will be generated for the user device domain, including a domain public key and a domain private key. The domain public key may be used by a content provider to encrypt content keys that are used to decrypt protected content. For example, content key 80a may be encrypted by content provider 22a using the public domain key associated with user device domain 28a. Therefore, unless device 30a has access to the domain private key, it is impossible for the device to decrypt and make use of content key 80a to decrypt digital content item 60a. Accordingly, as part of the trusted third-party management provided by domain manager 24, domain controller 34 may provide the domain private key to properly registered domain members. In the present example, device 30a has been properly registered by device registrar 32 (e.g., based on terms known to be acceptable to content provider 22a). Accordingly, domain private key 100 may be cryptographically bound to, and then transmitted to local enforcement agent 50a to allow decryption of content key 80a, content key 80b, etc.

As one non-limiting example, the domain key pair may be generated and/or provided as part of a domain certificate. For example, during domain setup, domain controller 34 may issue a domain certificate cryptographically signed by the domain controller 34 and containing the domain public key, with the domain private key being sent to device's local enforcement agent in some secure fashion. As part of a request to obtain protected content, the device 30a would then use the certificate—which was signed by domain controller 34—as an authenticated mechanism for providing the domain public key to a content provider. The authenticated certificate-based communication would allow the content provider to know that the user device domain was set up and/or being managed by the trusted third-party manager (e.g., domain manager 24).

Content consumers may want to add a new device to a user device domain after protected content has already been licensed to and accessed with a first device in the user device domain. This may occur for example, when the user replaces or upgrades a device, after a first device becomes lost or damaged, or for a variety of other reasons. In some cases, at the time the new device is being added, it will be impractical and/or impossible for the new device to interact with the content provider from which protected content was previously obtained for the initial device or devices in the user device domain. For example, the content provider may have gone out of business, ceased operations, or otherwise become unavailable.

Figure 3:
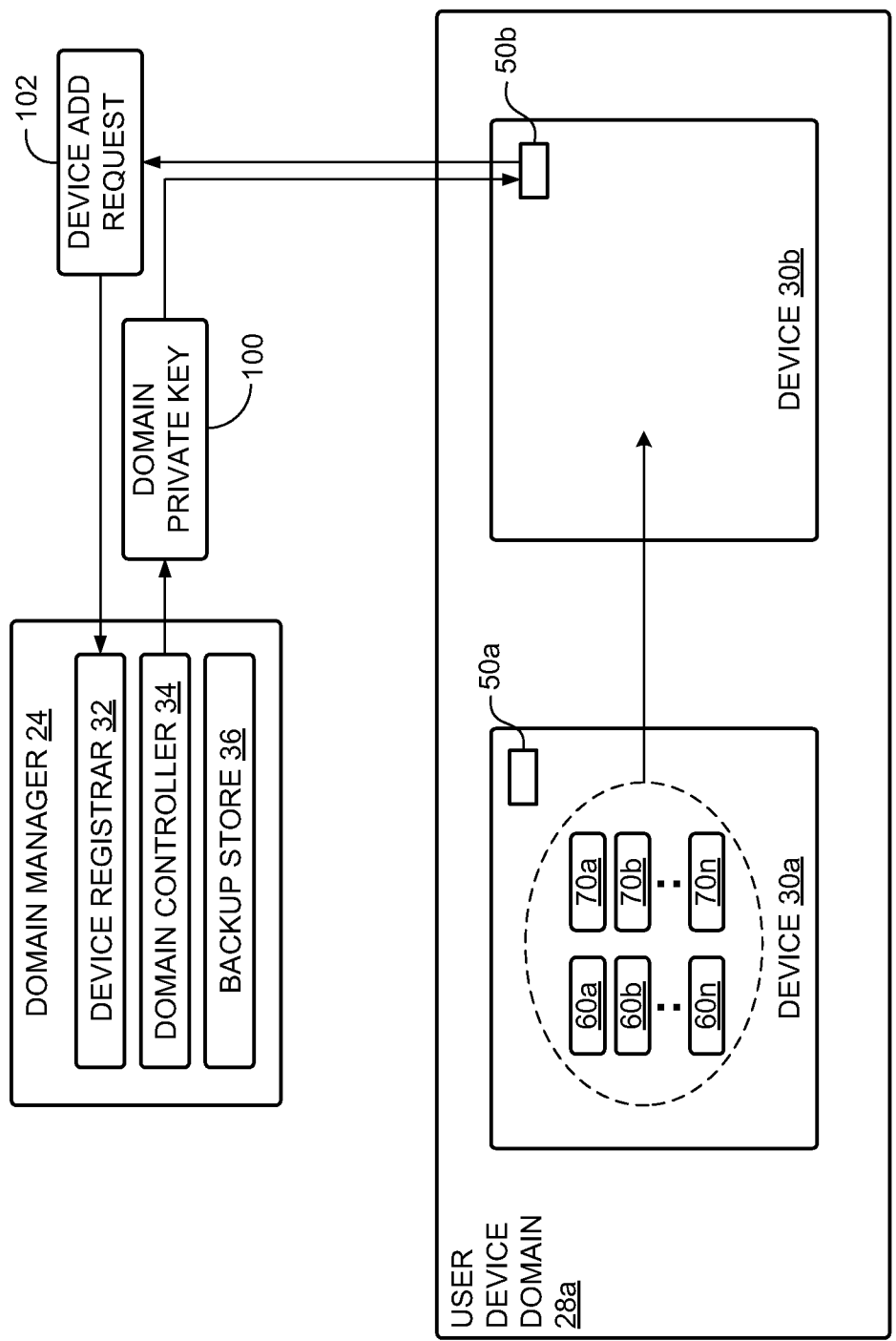
FIG. 3 schematically depicts an example scenario in which the trusted third-party domain manager of FIG. 2 facilitates addition of a device to an established user device domain.

Turning now to FIG. 3, the figure depicts an example of adding a new device to a user device domain. The depicted example may be implemented to allow the newly-added device to be used to access digital content previously licensed to the user device domain. Moreover, adding the device and using it to access previously licensed content may be accomplished in some examples without any interaction between the newly-added device and the content provider that previously licensed the content to the domain.

In FIG. 3, user device domain 28a includes existing device 30a, which, as discussed with reference to FIG. 2, was used to obtained licensed content from content provider 22a. Specifically, device 30a contains digital content item 60a and associated license 70a, digital content item 60b and associated license 70b, and digital content item 60n and associated license 70n. The content keys and policies are also stored on device 30a, though they are not specifically designated in FIG. 3. As in the other examples discussed herein, the licenses may be domain-bound, which thereby facilitates the ability of the trusted third party (domain manager 24) to ensure that content and licenses are still usable in the event of changes to the domain-device mapping.

To add device 30b to user device domain 28a, a device add request 102 may be provided to domain manager 24. In particular, the request may be sent to device registrar 32 from local enforcement agent 50b of the device being added to the domain. Device registrar may be configured to determine whether to grant or deny the request to add the device. Furthermore, this determination may be based on pre-existing arrangements with one or more content providers, such as content providers 22 of FIG. 1 or content provider 22a of FIG. 2. In one example, device registration is determined by a digital rights license of the content provider. For example, the digital content items offered by content provider 22a (FIG. 2) may be released subject to a device-count limitation on the user device domain. More particularly, a purveyor of digital music could specify that its music files are licensable to a user device domain that will include no more than 6 registered devices over the life of the user device domain. In the particular context of FIG. 2, such a restriction would mean that digital content item 60b could only ever be accessed by a total of 6 devices in user device domain 28a without paying for or otherwise obtaining a new license.

Regardless of the particular criteria employed, device registrar 32 typically is empowered, via the trusted relationship between domain manager 24 and the content provider, to determine whether to permit or deny a new requested mapping of devices with the user device domain. In the event that device add request 102 is granted, domain controller 34 is operative to cause transmission of domain private key 100 to the newly registered device (i.e., device 30b). In the specific depicted example, domain private key 100 is transmitted from domain controller 34 to local enforcement agent 50b. In another example, the domain controller may issue a command to cause a transmission of the domain private key from device 30a to device 30b, for example a transmission of the domain private key between the corresponding local enforcement agents 50a and 50b of the devices.

In addition, as also shown in FIG. 3, protected digital content may be provided from an existing device in the user device domain to the device being added. In particular, as indicated, digital content items 60a, 60b and 60n, and their associated licenses 70a, 70b and 70n, may be transferred from device 30a to device 30b. Then, local enforcement agent 50b may use domain private key 100 to decrypt the content keys in licenses 70a, 70b and 70n, so as to decrypt and provide user access to the associated digital content items.

Though many of the examples discussed herein involve an attempt to add a device to a domain, it should be understood that the device registrar typically will also manage device removal operations. As discussed elsewhere herein, domains often have a device-count limitation which is fixed to a specific number of devices. Accordingly, from time to time, a user may want or need to remove a device from a domain, for example to make room for new or additional devices. An existing device may become damaged or broken, fall out of fashion, become lost, etc. In such a scenario, the user may want to interact with the device registrar to remove the device and thereby construct a new domain-device mapping. The new mapping may also include a new device (e.g., a replacement of the device that is lost, damaged, etc.) added through the device-add methods described herein.

Figure 4:
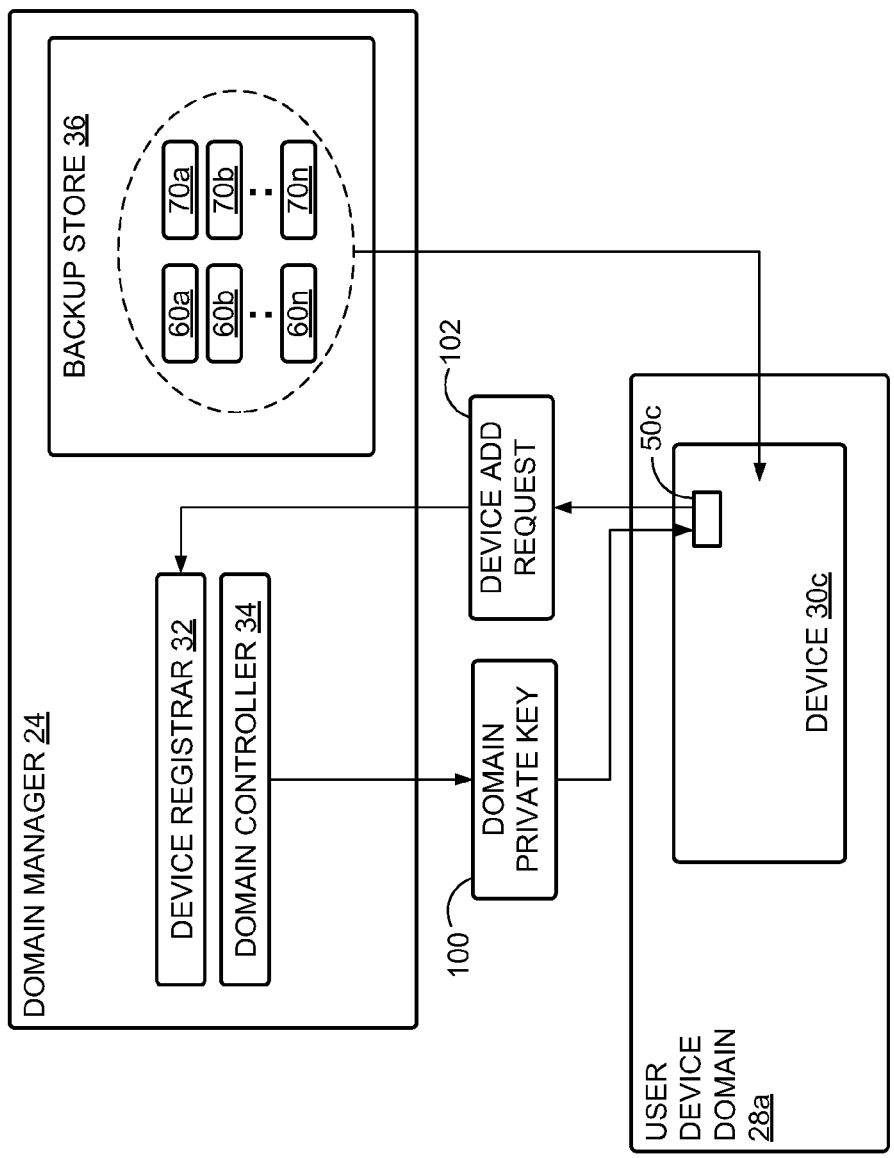
FIG. 4 schematically depicts another example scenario in which the trusted third-party domain manager of FIG. 2 facilitates addition of a device to an established user device domain.

FIG. 4 depicts another example scenario in which a new device may be added to an established user domain. In particular, device 30c is shown as requesting addition to user device domain 28a via transmission of a device add request 102 to device registrar 32 of domain manager 24, similar to the example process shown in FIG. 3. As in the previous example, domain private key 100 may be provided to a local enforcement agent 50c of the added device in the event that the device add request is granted.

As in the example of FIG. 3, the newly-added device in FIG. 4 may gain access to content that has been previously provided and licensed to user device domain 28a. In particular, the previously-licensed content (and associated licenses) may be stored at backup store 36 of domain manager 24.

Backup copies of digital content items and associated licenses may be stored at backup store 36 in a variety of ways. In one example, all of the content of a given content provider is mirrored or otherwise stored at backup store 36. For example if content provider 22a (FIG. 2) were a provider of downloadable music files, it could arrange to have its entire catalog of downloadable music backed up at backup store 36, for example to facilitate future content restoration at a user device or user device domain. Alternatively, backup store 36 may only provide backup copies for specific digital content items and/or associated licenses that have been provided to customers (e.g., via provision to a user device domain associated with a user account). In many cases, it will be desirable that backups be stored at backup store 36 as single-instance backups. When a single-instance backup scheme is employed, the system maintains only a single copy when backups are requested from multiple sources, as opposed to maintaining unnecessarily duplicative copies. For example, if a particular digital content item had been licensed to multiple user accounts, the backup store would only retain one electronic copy and reference it to the various device domains.

In any case, the backup copies in backup store 36 may be used to perform restoration operations to a user device domain, such as providing digital content items, associated licenses (including content keys and policies), etc. to a properly registered device. For example, the scenario in FIG. 4 can correspond to a situation where the user has lost all of the prior devices used to obtain content. Or perhaps the only other existing device has become damaged and/or unusable. In addition, the original content provider may have gone out of business or otherwise ceased operations. Indeed, the backup store may be particularly useful to a user in the event that all of the user's devices are lost, damaged, etc. and the original content provider is no longer in operation. Regardless of the particular situation, the digital content items and associated licenses which were previously issued to the user device domain (i.e., digital content items 60a, 60b and 60n and associated licenses 70a, 70b and 70n) may be provided to the newly-added device 30c from backup store 36. Then, domain private key 100 can be used to gain access to the content keys to enable decryption and use of the digital content items. As in the previous example, the initial trust relationship between the content provider and domain manager 36 may allow the device to be added and used to access the previously-licensed content without any interaction between the new device and the original content provider.

It should be understood that the backup store in the depicted examples may be used in scenarios other than the restoration example shown in FIG. 4. In some embodiments, for example, backups of content and/or licenses may be initiated in response to a request from any device properly bound to a user device domain. Alternatively, backups of content and/or licenses may be performed automatically, rather than in response to a specific request. Also, in addition to providing backups to new devices during domain-join operations, the backup store in general may provide backup copies of content, licenses (content keys), etc. to any device properly bound to a user device domain. Furthermore, the backup store may be used to provide automatic synchronization of content across properly registered devices in a user device domain. In particular, the backup store may be configured to use the backup copies of digital content items and associated licenses to provide the synchronization (e.g., by transmitting copies to devices that are properly registered and bound to the device domain). In some cases, it will be desirable that only a subset of devices in a given domain are synchronized. Accordingly, in one example of automatic synchronization, a request from the user is submitted specifying which devices of a user device domain are to be synchronized. Further user options may be received to control the specific content that is synchronized (e.g., synchronize only video content, or content from specific content libraries, etc.).

It should be understood that the present description may also encompass a digital rights method including central management of user device domains. FIG. 5 depicts an example of such a method 120. As shown at step 122, the method may include establishing a trusted third-party domain manager, such as the previously-described domain manager 24. In many cases, as discussed above, it will be desirable to have the trusted third-party domain manager handle user device domain management for multiple content providers that are independent of one another. For example, various benefits may arise from having the domain manager be implemented as a standard mechanism on which content providers rely to issue domain-bound licenses for protected digital content. Consumers can benefit in this scenario by being able to gain future access to licensed content without having to interact again with the original content provider (e.g., in the event the content provider ceases operations). Content providers similarly can promote to consumers that they will have a continuing ability to use licensed content in the future.

In any case, method 120 may also include receiving a request to add a device to an established user device domain, as shown at step 124. At step 126, the method includes determination of whether the device add request is to be granted. If the request is granted, the method includes providing a domain private key to the device being added to the user device domain (step 128). Specific examples of step 124, step 126 and step 128 are described with respect to FIGS. 2-4, though it will be appreciated that the described steps may be performed in other settings and/or in connection with other systems and devices. Furthermore, as described above, it will often be desirable that a central trusted third party handle management of user device domains. Accordingly, steps 124, 126 and 128 may be performed repeatedly as needed for multiple user device domains associated with multiple different user accounts on multiple different content providers. Furthermore, the trusted third-party management may include device removal operations in addition to or instead of the device add steps shown at 124 and 126.

In some embodiments, the above described methods and processes may be tied to a computing system having a logic subsystem and a data-holding subsystem. For example, the domain manager and its components may be stored on a data-holding subsystem (e.g., mass storage and memory devices on a server system), with the respective functionality being carried out or otherwise executed by the logic subsystem (e.g., a server processor and/or the processors of a group of servers). Similarly, the functionality occurring at the user devices may be carried out by application programs or other software held in a data-holding subsystem of the device, with processing operations being carried out by a logic subsystem (e.g., processor) of the device.

When employed in the example embodiments, a logic subsystem may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

When employed in the example embodiments, a data-holding subsystem may include one or more physical devices configured to hold data and/or instructions executable by the logic subsystem to implement the herein described methods and processes. When such methods and processes are implemented, the state of data-holding subsystem may be transformed (e.g., to hold different data). The data-holding subsystem may include removable media and/or built-in devices. The data-holding subsystem may include optical memory devices, semiconductor memory devices, and/or magnetic memory devices, among others. The data-holding subsystem may include devices with one or more of the following characteristics: volatile, nonvolatile, dynamic, static, read/write, read-only, random access, sequential access, location addressable, file addressable, and content addressable. In some embodiments, a logic subsystem and data-holding subsystem may be integrated into one or more common devices, such as an application specific integrated circuit or a system on a chip.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A domain-based digital rights management method enacted within a domain-manager computing system, the method comprising:

receiving, by the domain-manager computing system, a request to add a user device to a user-device domain;

wherein the domain-manager computing system being an independent, trusted third party with respect to a media-content provider and to the user-device domain;

releasing, by the domain-manager computing system, an encrypted content key to the user-device domain;

wherein the released encrypted content key is used to decrypt the received protected digital-media content;

determining, by the domain-manager computing system, whether to grant the received request;

based on a determination by the domain-manager computing system, that the received request was granted, sending a domain private key to the user device;

decrypting, the released encrypted content key, with the provided domain private key;

creating, by the domain-manager computing system, a content key;

creating, by the domain-manager computing system, a backup copy of the content key;

storing, by the domain-manager computing system, the created backup copy of the content key;

accessing, by the provided domain private key, the created backup copy of the content key that decrypts the protected digital-media content;

sending, by the domain-manager computing system, the created backup copy of the content key for transmission to user devices of the user-device domain;

storing, by the domain-manager computing system, a backup copy of a license for the protected digital-media content; and sending the backup copy of the license for transmission to user device of the user-device domain.

2. The method of claim 1 further comprising storing a backup copy of the protected digital-media content.

3. The method of claim 2 wherein the user device is a first user device, the method further comprising automatically synchronizing the protected digital-media content among multiple devices of the user-device domain by providing the backup copy of the protected digital-media content and a backup copy of the associated license to a second device of the user-device domain.

4. The method of claim 2 further comprising providing the backup copy of the protected digital-media content for transmission to any user device of the user-device domain.

5. A domain-based digital rights management method enacted within a domain-manager computing system, the method comprising:

receiving, by the domain-manager computing system, a request to add a user device to a user-device domain;

wherein the domain-manager computing system being an independent, trusted third party with respect to a media-content provider and to the user-device domain;

releasing, by the domain-manager computing system, an encrypted content key to the user-device domain;

wherein the released encrypted content key is used to decrypt the received protected digital-media content;

determining, by the domain-manager computing system, whether to grant the received request;

based on a determination by the domain-manager computing system, that the received request was granted, providing a domain private key to the user device;

decrypting, the released encrypted content key, with the provided domain private key;

creating, by the domain-manager computing system, a content key;

creating, by the domain-manager computing system, a backup copy of the content key;

storing, by the domain-manager computing system, the created backup copy of the content key;

accessing, by the provided domain private key, the created backup copy of the content key that decrypts the protected digital-media content;

sending, by the domain-manager computing system, the created backup copy of the content key for transmission to user devices of the user-device domain;

storing, by the domain-manager computing system, a backup copy of a license for the protected digital-media content; and sending the backup copy of the license for transmission to user devices of the user-device domain.

* * * * *